US012358111B2

(12) United States Patent
Lamb et al.

(10) Patent No.: US 12,358,111 B2
(45) Date of Patent: Jul. 15, 2025

(54) SELF ALIGNING BUMPER FOR PNEUMATIC FRAMING TOOLS

(71) Applicant: PneuTools, Inc., Arlington, TN (US)

(72) Inventors: Frederick William Lamb, McDonald, PA (US); Frederick William Lamb, II, Canonsburg, PA (US)

(73) Assignee: PneuTools, Inc., Arlington, TN (US)

( * ) Notice: Subject to any disclaimer, the term of this patent is extended or adjusted under 35 U.S.C. 154(b) by 215 days.

(21) Appl. No.: 18/191,190

(22) Filed: Mar. 28, 2023

(65) Prior Publication Data

US 2023/0302616 A1 Sep. 28, 2023

Related U.S. Application Data

(60) Provisional application No. 63/324,441, filed on Mar. 28, 2022.

(51) Int. Cl.
*B25C 1/00* (2006.01)
*B25C 1/04* (2006.01)

(52) U.S. Cl.
CPC .................................... *B25C 1/047* (2013.01)

(58) Field of Classification Search
CPC ...................................................... B25C 1/047
See application file for complete search history.

(56) References Cited

U.S. PATENT DOCUMENTS

| | | | | |
|---|---|---|---|---|
| 2018/0361560 | A1* | 12/2018 | Chen | B25C 1/047 |
| 2019/0168368 | A1* | 6/2019 | Fan | B25C 7/00 |
| 2019/0375084 | A1* | 12/2019 | Bierdeman | B25C 1/047 |
| 2020/0061788 | A1* | 2/2020 | Pedicini | B25C 1/047 |
| 2020/0114500 | A1* | 4/2020 | Bierdeman | B25C 1/047 |
| 2020/0215672 | A1* | 7/2020 | Pomeroy | B25C 1/047 |
| 2020/0246950 | A1* | 8/2020 | Desch | B25C 1/041 |
| 2021/0237242 | A1* | 8/2021 | Carrier | B25C 1/047 |
| 2021/0347022 | A1* | 11/2021 | Leathrum | B25C 1/047 |
| 2022/0009069 | A1* | 1/2022 | Fan | B25C 7/00 |

* cited by examiner

*Primary Examiner* — Eyamindae C Jallow
(74) *Attorney, Agent, or Firm* — Reed Smith LLP; Matthew P. Frederick; Paul J. McDonnell

(57) ABSTRACT

A pneumatic framing tool includes a housing with an axis of symmetry X, a nose with a tubular portion centered about the axis X and secured to the housing by at least one bolt, a sleeve disposed within the housing, a piston driver disposed within the sleeve having a base portion centered about axis X and a tubular portion that extends from the base portion along the axis X into the tubular portion of the nose, and a bumper disposed within the sleeve such that the tubular portion of the piston driver extends through a center of the bumper along axis X. The bumper include a plurality of retaining alignment protrusions that align the bumper in the sleeve and an external concentric ring that rests between the sleeve and the nose and allows for removal of the bumper without removing the bolts and the nose from the tool.

21 Claims, 5 Drawing Sheets

SELF ALIGNING BUMPER FOR PNEUMATIC FRAMING TOOLS

CROSS-REFERENCE TO RELATED APPLICATION

This application claims the benefit under 35 U.S.C. § 119(e) of the earlier filing date of U.S. Provisional Patent Application No. 63/324,441 filed on Mar. 28, 2022, the disclosure of which is incorporated by reference herein.

TECHNICAL FIELD

This disclosure relates generally to the field of pneumatic tools.

BACKGROUND

Pneumatic tools describe mechanical devices that convert compressed air energy into a reciprocating linear motion, often by driving a piston in a desired direction.

SUMMARY

According to exemplary embodiments of this disclosure, a pneumatic framing tool may include a housing with an axis of symmetry (X). The housing may include a first end, a second end, a body extending from the first end to the second end, and an annular impact cavity located at the second end positioned such that an opening to the annular impact cavity is exposed to an interior of the housing along an interior surface of the body of the housing. The pneumatic framing tool may also include a nose centered about the axis X and including a base portion secured to the second end of the housing by at least one bolt and a tubular portion that extends axially away from the second end of the housing. A sleeve may be disposed within the housing and extend axially from a bottom end, which coincides with the second end of the housing, to a top end located at the first end of the housing. A piston driver may be disposed within the sleeve and include a base portion at a second end of the piston driver extending circumferentially from the axis X and a tubular portion that extends axially from the base portion of the piston driver along the axis X into the tubular portion of the nose to a second end of the piston driver. The pneumatic framing tool may also include a bumper that may include a body defined by a tiered ring shape centered about the axis X and extending axially between a top surface located at a top end of the body and a bottom surface located at a bottom end of the body. The tiered ring shape may include a first ring portion having an outer radius and an inner radius and a second ring portion having an outer radius and an inner radius. In some embodiments, the outer radius of the first ring portion may be less than the outer radius of the second ring portion, and a top boundary of the second ring portion may be tapered such that the first portion and the second portion form a continuous exterior surface of the body. The bumper may further include an external concentric ring circumferentially spaced from the axis X and positioned axially about the body of the bumper, where an outer radius of the external concentric ring is greater than the outer radius of the second ring portion and an inner radius of the concentric ring is substantially equal to the outer radius of the second ring portion. The bumper may still further include a plurality of tapered retaining alignment protrusions circumferentially spaced on the exterior surface of the body. In some embodiments, the retaining alignment protrusions may include a curved portion extending axially from a base located on a top surface of the external concentric ring to an upper boundary located at a portion of the exterior surface of the body axially between the top end of the body and the external concentric ring. In some embodiments, the bumper may be disposed in the housing at the second end of the housing, in which case the bottom surface of the bumper may contact an interior surface of the base of the nose, the external concentric ring may extend between the bottom end of the sleeve and the base portion of the nose and such that the external concentric ring is adjacent to the annular impact cavity of the housing but does not fill the annular impact cavity (i.e., the impact cavity remains empty). In some embodiments, the tubular portion of the piston driver extends axially through the bumper along the axis of symmetry X.

In some embodiments, a bottom surface of the base of the piston driver may impact the top surface of the bumper in a down position during use.

In some embodiments, the piston driver may be removable from the sleeve through the top end of the sleeve.

In some embodiments, the bumper may be insertable and removable from the sleeve through the top end of the sleeve.

In some embodiments, the annular impact cavity may have an axial length that may be less than an axial length of the external concentric ring of the bumper.

In some embodiments, each of the plurality of retaining alignment protrusions may contact an internal wall of the sleeve.

In some embodiments, a sum of a radial thickness of the base of each retaining alignment protrusion and the outer radius of the second ring portion of the body of the bumper is at most 10% greater than an inner radius of the sleeve and is at least 10% less than the inner radius of the sleeve.

In some embodiments, the inner radius of the sleeve may be about 28.5 mm.

In some embodiments, the outer radius of the external concentric ring may be equal to an outer radius of the sleeve.

In some embodiments, a radial thickness of the base of the retaining alignment protrusion may be less than a radial thickness of the concentric ring.

In some embodiments, a sum of the inner radius of the external concentric ring and the radial thickness of the base of the retaining alignment protrusion is greater than an inner radius of the sleeve.

According to exemplary embodiments or the present disclosure, an impact absorbing bumper having an axis of symmetry (Y) may include a body that may be defined by a tiered ring shape centered about the axis of symmetry (Y) that extends axially between a top surface located at a top end of the body and a bottom surface located at a bottom end of the body. In some embodiments, the tiered ring shape may include a first ring portion with an outer radius and an inner radius, a second ring portion with an outer radius and an inner radius, and a base portion with an inner radius and an outer radius. In some embodiments, the outer radius of the first ring portion is less than the outer radius of the second ring portion. In some embodiments, the second ring portion may include a tapered top boundary such that the first portion and the second portion form a continuous exterior surface of the body. In some embodiments, the base portions forms a continuous exterior surface with the second ring portion. The impact absorbing bumper may further include an external concentric ring circumferentially spaced from the axis of symmetry (Y) and positioned axially about the body of the bumper. In some embodiments, the external concentric ring may have an outer radius that may be greater than the outer radius of the second ring portion and an inner radius that may be substantially equal to the outer radius of the second ring portion. In some embodiments, the external concentric ring is positioned axially such that at least a portion of the base of the tiered ring shape extend axially beyond a bottom surface of the external concentric ring. The bumper may still further include a plurality of tapered retaining alignment protrusions circumferentially spaced on the exterior surface of the body. In some embodiments, the protrusions may be defined by a curved portion extending axially from a base located on a top surface of the external concentric ring to a tapered boundary located at a portion of the exterior surface of the body axially between the top end of the body and the external concentric ring.

In some embodiments, the portion of the exterior surface of the body axially between the top end of the body and the external concentric ring may be the top boundary of the second portion.

In some embodiments, a radial thickness of the base of the retaining alignment protrusions may be less than a radial thickness of the concentric ring.

In some embodiments, the inner radius of the first ring portion and the inner radius of the second ring portion may be equal.

In some embodiments, the plurality of tapered retaining alignment protrusions may be 8 protrusions.

In some embodiments, the plurality of tapered retaining alignment protrusions may be evenly spaced about the external concentric ring.

According to exemplary embodiments of the present disclosure, an impact absorbing bumper may be used in a pneumatic tool that includes an annular impact cavity defined in part by a housing and a nose portion. In some embodiments, the housing and the nose portion may be assembled together by at least one nose bolt, and each the housing and the nose portion may extending circumferentially about an axis of symmetry. In some embodiments, the impact absorbing bumper may include a circumferential body defining a first radial void about an axis of symmetry pf the pneumatic framing tool. In some embodiments, the first radial void may receive a tubular portion of a piston driver in an assembled configuration. The circumferential body may include a first radially outer annular surface defining a first radius that may be less than a second radius defined by an inner surface of the housing. In some embodiments, the impact absorbing bumper may also include an external circumferential ring annularly extending from a base portion of the circumferential body that may annularly abut the inner surface of the housing, whereby, when in the assembled configuration, a radially external annular surface of the external circumferential ring defines a radially inner external boundary of the annular impact cavity.

In some embodiments, the first radius is less than a third radius defined by an inner surface of a cylindrical sleeve of the pneumatic framing tool. The impact absorbing bumper may further include a plurality of radially extending alignment protrusions disposed about the first radially outer annular surface and positioned axially above the external circumferential ring. In some embodiments, each radially extending alignment protrusions may define a radius that may be about equal to the third radius.

In some embodiments, an annular bottom surface of the cylindrical sleeve may abut an annular top surface of the external circumferential ring.

In some embodiments, an outer surface of the cylindrical sleeve may abut the inner surface of the housing above the annular impact cavity, and a bottom surface of the external circumferential ring may abut the nose portion.

According to exemplary embodiments of the present disclosure, a method for inserting a bumper into a housing of a pneumatic framing tool may include opening the housing of the pneumatic framing tool at a first end opposite a second end. In some embodiments, the second end may include an annular impact cavity, a nose axially opposite the annular impact cavity, and a plurality of bolts configured to secure the nose to the housing at the second end of the housing. The method may further include inserting the bumper into the housing through the first end of the housing. In some embodiments, the bumper may include an annular body having an external outer surface that may define a second radius that may be less than a first radius of the sleeve such that, in an assembled configuration, the external outer surface of the annular body does not contact the internal surface of the sleeve. The bumper may further include a plurality of alignment protrusions disposed circumferentially about the external outer surface, each alignment protrusion radially extending from the external outer surface and defining a third radius that is equal to or greater than the first radius. The bumper may still further include an external circumferential ring extending radially outward from a base portion of the external outer surface to define an annular external surface that may define a fourth radius larger than the first radius and further defining a lower surface that extends radially and may contact an internal surface of the nose. The method may further include inserting a sleeve into the housing through the first end of the housing and over the bumper. In some embodiments, an outer surface of the sleeve may abut an inner surface of the housing above the annular impact cavity, and a bottom axial surface of the sleeve may abut a top axial surface of the external circumferential ring. The method may further still include inserting a piston driver into the housing through the first end of the housing. In some embodiments, a tubular portion of the piston driver may extend through a center of the bumper and into a tubular portion of the nose. In some embodiments, the fourth radius may be defined such that externally circumferential ring does not fill any portion of the annular impact cavity.

BRIEF DESCRIPTION OF THE DRAWINGS

Example embodiments in accordance with this disclosure will now be described with reference to the attached figures.

DETAILED DESCRIPTION

Described herein are embodiments of a bumper for a pneumatic framing tool. In certain embodiments, the bumper does not include an external retaining ring. In certain embodiments, force is reduced into the bolts through the housing because the bumper does not contact the wall of the housing. Furthermore, embodiments of the present disclosure include a bumper including retaining protrusions that align and secure the bumper inside the housing by retaining it against a sleeve that rests within the housing. In this way, the bumper may be inserted and removed through the top end of the housing opposite the nose without requiring removal of the nose from the housing and, and therefore avoiding removal and potential destruction of the bolts during the removal process.

When referencing FIGS. 1, 3A, 3B, 4A, 4B, and 5, the terms and the expressions indicating positions and orientations such as "radial" and "axial" are understood as being in relation to an axis of symmetry X.

Figure 1:
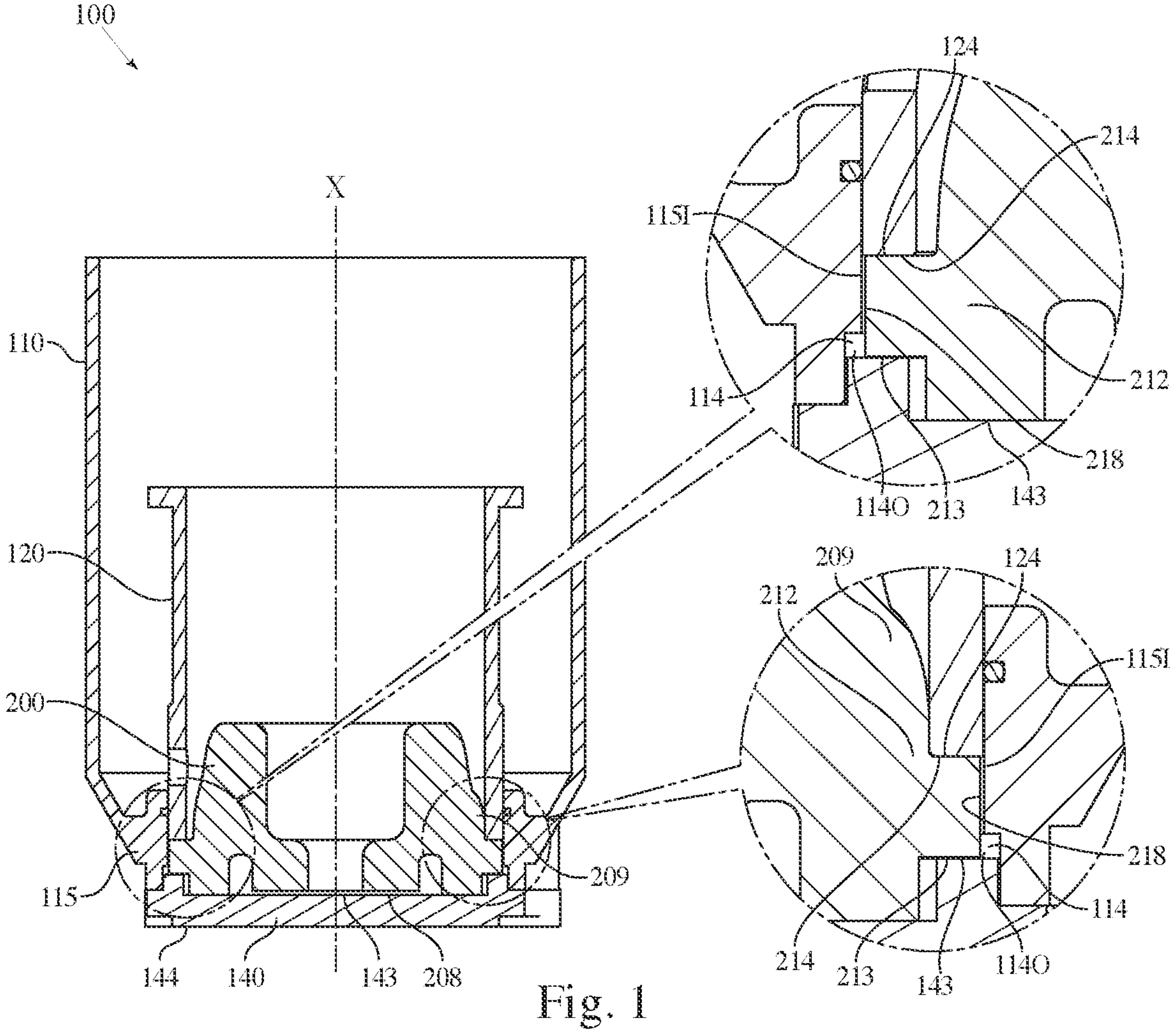
FIG. 1 illustrates exemplary embodiments of aspects of a pneumatic framing tool in accordance with this disclosure, omitting a piston driver.

FIG. 1 discloses aspects of exemplary embodiments of a pneumatic framing tool 100 having an axis of symmetry X in accordance with this disclosure.

In various embodiments, a pneumatic framing tool 100 may include a housing 110, a sleeve 120, and a bumper 200.

A housing 110 may include a first end 111 (see FIG. 4A), a second end 112 (see FIG. 4B), and a body 113. In some embodiments, a body 113 is a hollow cylindrical shape, where a first end 111 and a second end 112 are open. In some embodiments, second end 112 includes a frustoconical end 115 with a cylindrical inner surface 115I defining a radius 115(1) (see FIG. 3B) and an external surface 115E defining radius 115(2) (see FIG. 3B) that decreases in the axial direction away from first end 111.

Figure 5:
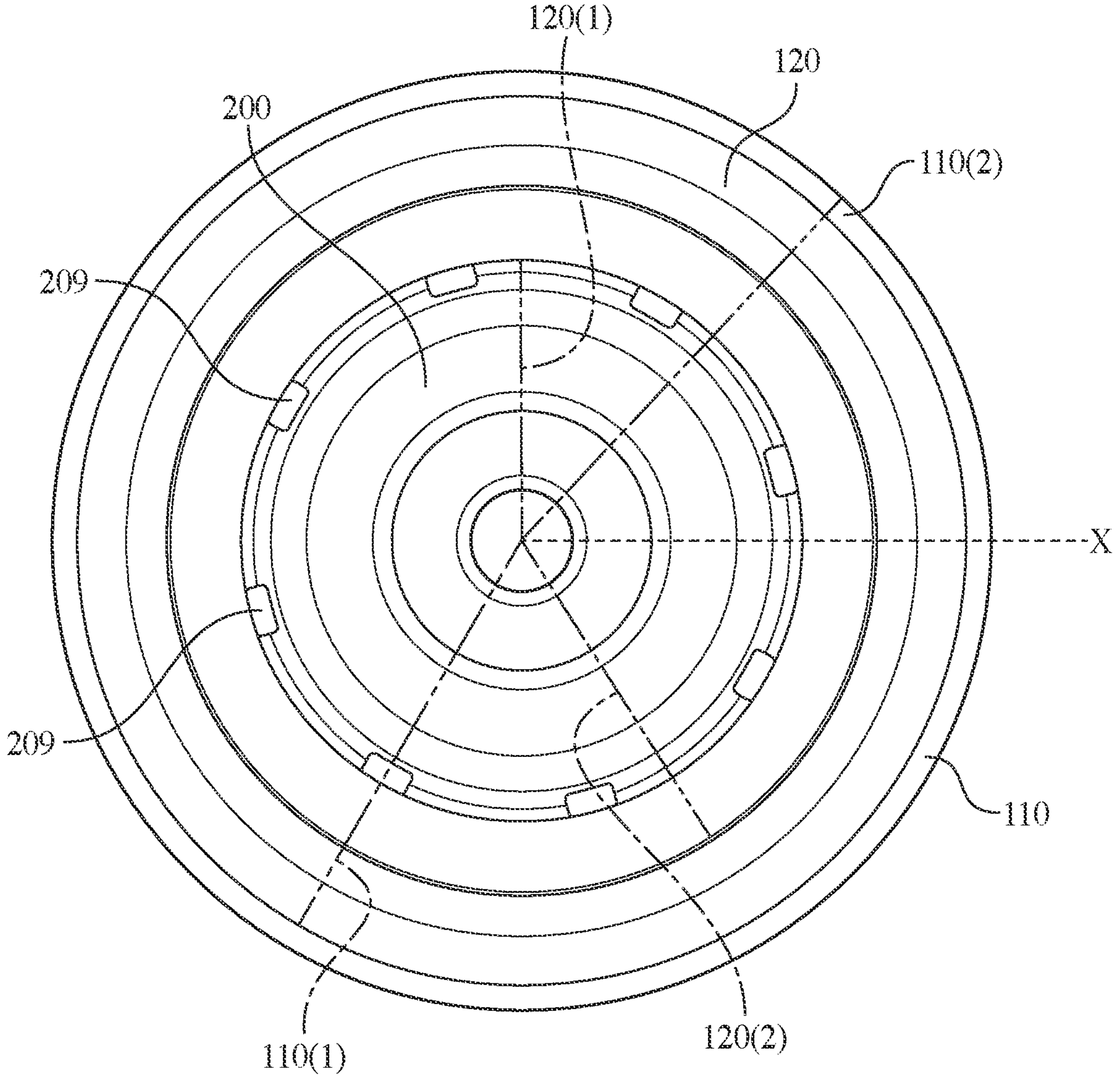
FIG. 5 presents a view along a direction of an axis of symmetry (X) of exemplary embodiments of aspects of a pneumatic framing tool in accordance with this disclosure, omitting the piston.

An interior wall 110I of housing 110 may define an inner radius 110(1) (see FIG. 5) and an external wall 110E may define an outer radius 110(2) (see FIG. 5).

In various embodiments, a housing 110 may further include an annular impact cavity 114 located at a second end 112 such that an opening 114O (see FIG. 1) extending into annular impact cavity 114 is exposed along an interior wall 110I of a body 113. In some embodiments, an annular impact cavity 114 is located at a frustoconical end 115 such that an opening 114O is exposed to an interior of housing 110 along an interior surface 115I. In certain embodiments, an external surface of second end 112 may not be frustoconical in shape, and in various embodiments may be cylindrical or any other suitable shape as desired.

In various embodiments, a sleeve 120 may be disposed within a housing, e.g., housing 110, and may include a cylindrical body 121 (see FIG. 3A) extending axially from a bottom end 122 (FIG. 3B), which is at second end 112 of housing 110, and a top end 123, which is at first end 111 of housing 110. Sleeve 120 may have an internal surface 120I defining an inner radius 120(1) (see FIG. 5) and an external surface 120E defining an outer radius 120(2) (see FIG. 5). In certain embodiments, in an assembled configuration, external surface 120E may abut interior wall 110I of housing 110 at second end 112, such that outer radius 120(2) of a sleeve 120 is less than inner radius 110(1) of a housing 110.

In some embodiments, an inner radius 120(1) of sleeve 120 may be 28.5 mm, or about 28.5 mm.

In some embodiments, outer radius 120(2) is substantially equal to inner radius 115(1) of a housing 110 such that a portion of exterior surface 120E abuts an interior surface 115I of a frustoconical end 115.

Figure 2A:
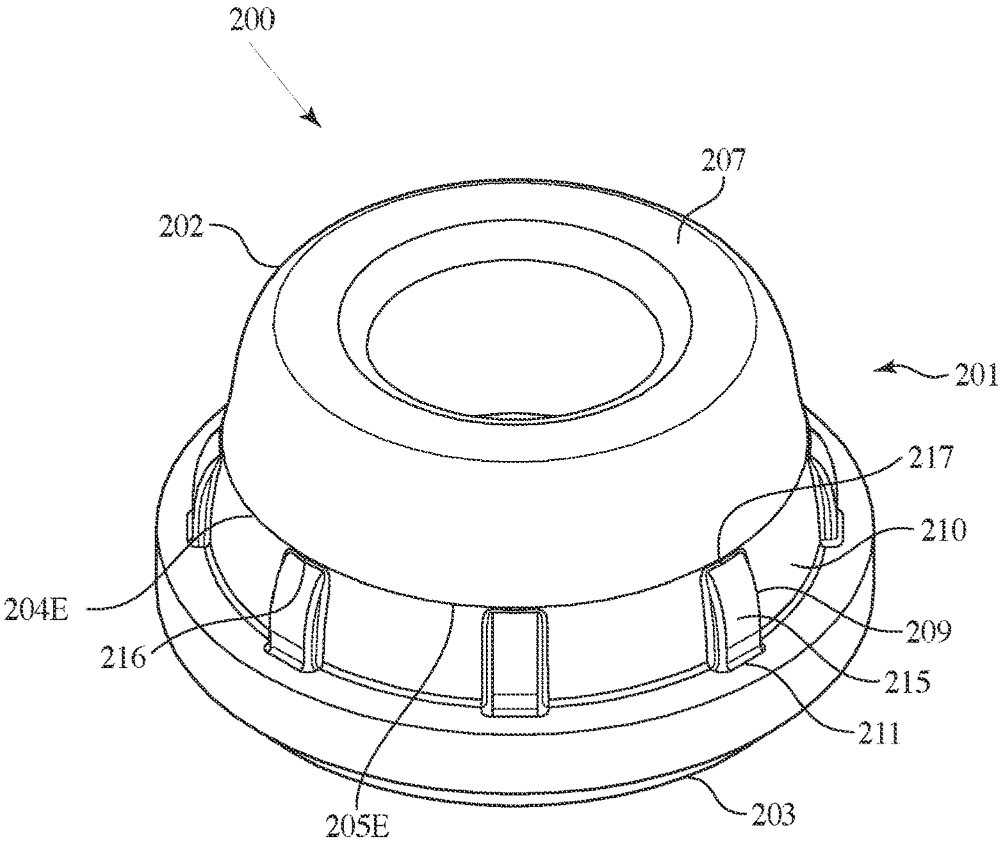
FIG. 2A is an overhead view of embodiments of a bumper in accordance with this disclosure.
Figure 2B:
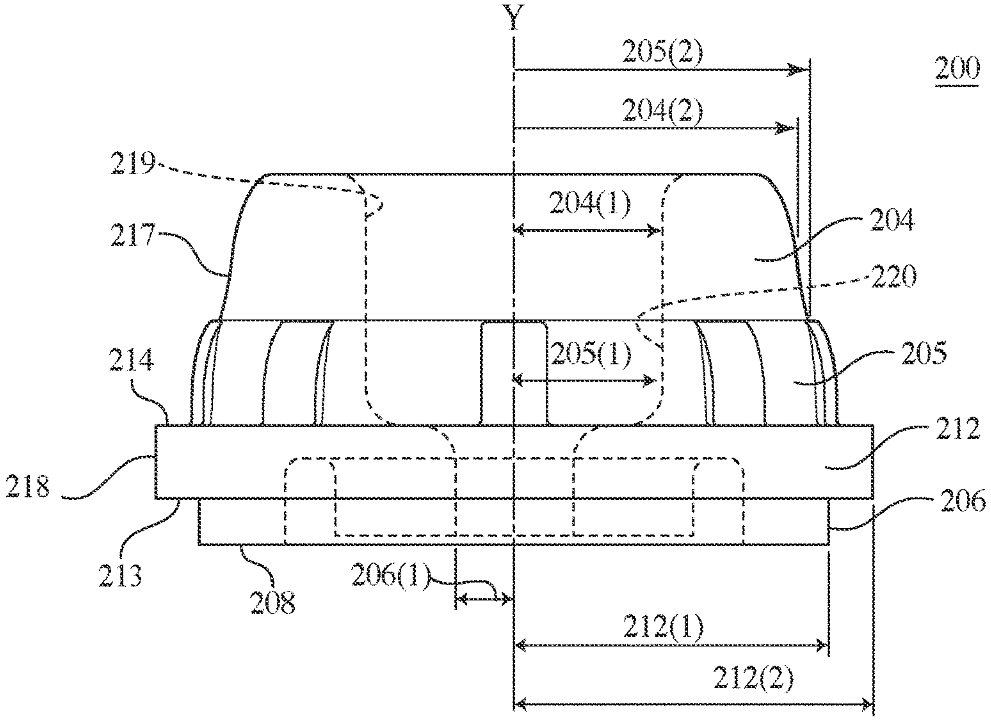
FIG. 2B is side view illustration of exemplary embodiments of a bumper in accordance with this disclosure and illustrating certain internal aspects with dotted lines.

When referencing FIGS. 2A and 2B, the terms and the expressions indicating positions and orientations such as "radial" and "axial" are understood as being in relation to an axis of symmetry Y.

FIGS. 2A and 2B present aspects of exemplary embodiments of a bumper 200 having an axis of symmetry Y in accordance with this disclosure. One will appreciate that in an assembled configuration, axis of symmetry Y may coincide with an axis of symmetry of a pneumatic framing tool, e.g., axis of symmetry X of pneumatic framing tool 100, 300.

In at least one embodiment, a bumper 200 may include a circumferential body 201 with a top end 202 and a bottom end 203. Circumferential body 201 may define a tiered ring shape that includes a first ring portion 204, a second ring portion 205, and a base portion 206. As illustrated, in such embodiments first ring portion 204 may be stacked on top of second ring portion 205 such that a top surface 207 of first ring portion 204 coincides with top end 202, and second ring portion 205 may be stacked on top of base portion 206 such that a bottom surface 208 of base portion 206 coincides with bottom end 203.

In some embodiments, an inner radius 204(1) of first ring portion 204 defined by a first radially inner annular surface 219 may be substantially equal to an inner radius 205(1) of second ring portion 205 defined by a second radially inner annular surface 220. In other embodiments, inner radius 204(1) may be larger than inner radius 205(1). In still other embodiments, inner radius 204(1) may be smaller than inner radius 205(1).

In some embodiments, inner radius 204(1) and inner radius 205(1) may be between about 12.5 mm and about 17.5 mm. Larger radii may result in a reduction in a size of a wall of bumper 200, defined by a difference between inner radius 204(1) and outer radius 204(2) and inner radius 205(1) and outer radius 205(2), respectively, which may reduce the lifespan of bumper 200.

In some embodiments, inner radius 206(1) may be greater than about 10.9 mm, and in particular may be between about 11 mm and about 13.5 mm.

It should be appreciated that, while exemplary bodies, e.g., body 201, are described herein as including a first ring portion 204 and a second ring portion 205, in certain embodiments, a body, e.g., 201, may alternatively include more than two ring portions or less. In other embodiments, a body, e.g., 201, may include only one ring portion. In yet another embodiment, a body, e.g., 201, may include a single frustoconical portion (not illustrated)

In certain embodiments, a first ring portion 204 may be defined between a bottom boundary 204E and top surface 207. A second ring portion 205 may be defined between an upper boundary 205E and a base portion 206 of bumper 200. In some embodiments, first ring portion 204 may taper radially inwardly from boundary 205E toward top surface 207, and second ring portion may taper radially inward towards upper boundary 205E from base portion 206. In some embodiments, bottom boundary 204E and upper boundary 205E may meet to form a continuous exterior surface with upper boundary 205E. In some embodiments, base portion 206 may form a continuous exterior surface with second ring portion 205. In certain embodiments herein, the bumper is unitary, or made of a single continuous piece e.g. by injection molding. In these embodiments, the first ring portion 204, second ring portion 205, and base portion 206 are unitary. In certain embodiments, "continuous exterior surface" means that two adjoining surfaces are unitary, or made of a single continuous piece e.g. by injection molding.

In certain embodiments, a bumper, e.g., bumper 200, may have an external concentric ring 212, annularly extending from body 201, defining an outer radius 212(2) that is greater than an outer radius 205(2) defined by second ring portion 205 and an inner radius 212(1) that is substantially equal to outer radius 205(2). In some embodiments, external concentric ring 212 may extend from base portion 206. External concentric ring 212 may be positioned on an exterior surface, e.g., 210, of body 201. In certain embodiments, the external concentric ring 212 is unitary with bumper 200.

External concentric ring 212 may have a top surface 214 facing top end 202 of body 201 and a bottom surface 218 facing bottom end 203 of body 201.

In some embodiments, an external concentric ring 212 may be positioned axially such that at least some portion of a first ring portion 204 and at least some portion of a second ring portion 205 and at least some portion of base portion 206 extend axially beyond external concentric ring 212. In another embodiment, an external concentric ring 212 may be positioned axially such that a bottom surface 213 of such an external concentric ring 212 coincides axially with a bottom surface 208 of a base portion 205. In other words, external concentric ring 212 may be variably positioned axially along a body 201 in various embodiments.

In some embodiments, external concentric ring 212 may be positioned axially along body 201 of bumper 200 such that an axial distance between bottom surface 213 of external concentric ring and bottom surface 208 of base 206 is about 4 mm and an axial distance between top surface 214 of external concentric ring 212 and bottom surface 208 is between about 10.5 mm and about 11 mm. In such embodiments, an axial thickness of external concentric ring 212 may be between about 6.5 mm and about 7 mm. In some embodiments, external concentric ring 212 may be positioned about 10% further down bumper 200 along axis Y (i.e., toward base 206) and about 10% further up bumper 200 along axis Y (i.e., away from base 206).

Various bumper embodiments in accordance with this disclosure, e.g., bumper 200, may include a plurality of retaining alignment protrusions 209 circumferentially spaced around an exterior surface 210 of body 201. In embodiments, the retaining alignment protrusions 209 are unitary with the bumper 200. Such retaining alignment protrusions 209 may include a curved portion 215 that extends from a base 211 that is disposed on a top surface 214 of an external concentric ring 212 to a boundary 216 located at a portion of exterior surface 210 of body 201 axially between a top end 202 and external concentric ring 212. In some embodiments, retaining alignment protrusions 209 may instead be a single continuous retaining alignment protrusion that extends annularly around a circumference of bumper 200. Retaining alignment protrusions 209 may strengthen bumper 200 by reinforcing it at a position where walls of bumper 200 are thinner, thus improving the lifespan of bumper 200 by improving durability.

In some embodiments, the number of retaining alignment protrusions 209 may be between 4 and 8. In certain embodiments, bumper 200 may include at least 4 retaining alignment protrusions 209. Using fewer than 4 retaining alignment protrusions 209 may negatively affect performance of a pneumatic framing tool, e.g., pneumatic framing tool 100, 300 by reducing an overall balance of bumper 200 within sleeve 120 in an assembled configuration.

In some embodiments, a plurality of retaining alignment protrusions 209 are evenly spaced annularly around bumper 200. In other embodiments, a plurality of retaining alignment protrusions 209 are not evenly spaced around bumper 200.

In some embodiments, base 211 of retaining alignment protrusions 209 has a radial thickness that is less than a radial thickness of the concentric ring 212 such that concentric ring 212 may be inserted between a sleeve, e.g., sleeve 120 (see FIGS. 1, 3, 4) and a nose, e.g., nose 140 (see FIGS. 1, 3, 4) of a pneumatic framing tool assembly, e.g., pneumatic framing tool assembly 100 (see FIGS. 1, 3, 4). In some embodiments, base 211 of retaining alignment protrusions 209 may have a radial thickness that, when added with an outer radius 205(5) of second ring portion 205 of bumper 200, results in a total radius that may be at most about 28.75 mm, but no less than about 27.5 mm. In some embodiments, a sum of outer radius 205(2) and a radial thickness of base 211 of protrusions 209 may be about 23 mm. Such radial dimensions are desirable to achieve a fit within sleeve 120 when assembled.

In some embodiments, retaining alignment protrusions 209 may be sized such that base 211, together with body 201 of bumper 200, extends radially to a distance equal to an inner radius 120(1) of sleeve 120. In some embodiments, base 211, together with body 201, may have a radius at most 10% greater than inner radius 120(1) of sleeve 120 and no less than 10% less than inner radius 120(1). If base 211, together with body 201, extends less than 10% less than inner radius 120(1) of sleeve 120, then retaining alignment protrusions 209 may not secure bumper 200 inside sleeve 120 when assembled. If base 211, together with body 201, extends further than inner radius 120(1), then retaining alignment protrusions may push outward on sleeve 120 with too much force when assembled and may even prevent sleeve 120 from being inserted over bumper 200 entirely, which can cause pneumatic framing tool 300 (see FIGS. 3, 4) to malfunction during use.

In some embodiments, boundary 216 is located at a boundary 217 where first ring portion 204 and second ring portion 205 meet.

In some embodiments, bumper 200 may be made of nitrile butadiene rubber (NBR) or Thermoplastic Polyurethane (TPU). In one embodiment, bumper 200 may be made from Adiprene® C930 MDI-Terminated Caprolactone Prepolymer (LANXESS Deutschland GmbH, Cologne, Germany). In certain embodiments, bumper 200 made of Adiprene® C930 MDI-Terminated Caprolactone Prepolymer (LANXESS Deutschland GmbH, Cologne, Germany) may include a density of 1.19 g/cm$^3$ at a temperature of about 70° C., a viscosity of 4,000 Centipoise at about 50° C., a viscosity of 1,400 at about 70° C., a viscosity of 400 at about 100° C., and a hardness of between about 83 and about 93. In another embodiment, bumper 200 may be made from Adiprene® LFP R375 Low Free pPDI-Terminated Polycarbonate Prepolymer (LANXESS Deutschland GmbH, Cologne, Germany). In certain embodiments, bumper 200 may be made of Adiprene® LFP R375 Low Free pPDI-Terminated Polycarbonate Prepolymer (LANXESS Deutschland GmbH, Cologne, Germany) may include a viscosity of 6,000 Centipoise at about 80° C., a viscosity of 2,500 Centipoise at about 100° C., and a hardness of about 93-95°.

In another embodiments, bumper 200 may be made of NBR 85 Shore A (black) (PU1TEC Dichtungen and Kunstsoffe Gmbh, Klangenfurt, Austria). In certain embodiments, bumper 200 made of NBR 85 Shore A (black) (PU1TEC Dichtungen and Kunstsoffe Gmbh, Klangenfurt, Austria) may include the following technical specifications:

| Properties | Condition | Standard | Unit | | Unit | |
|---|---|---|---|---|---|---|
| Color | | | | | | black |
| Hardness | 23° C./3 sec. | ISO 868 | Shore A | 85 ± 5 | | |
| | 23° C./15 sec. | | | 83 ± 5 | | |
| Modulus 100% | 23° C. | DIN 53 504 | MPa | ≥11 | psi | ≥1595 |
| Modulus 300% | 23° C. | DIN 53 504 | MPa | | psi | ≥2465 |
| Tensile strength | 23° C. | DIN 53 504 | MPa | ≥17 | psi | ≥6530 |
| Elongation at break | 23° C. | DIN 53 504 | % | ≥150 | | |
| Tear strength | 23° C. | DIN ISO 34-1 | KN/m | ≥18 | lbf/ inch | ≥102 |
| Specific gravity | 23° C. | ISO 1183 | $Kg/m^3$ | 1280 | $g/cm^3$ | 1.28 |
| Rebound Elasticity | | DIN53 512 | % | 20 | | |
| Abrasion | 23° C. | DIN 53 516 | $mm^3$ | 100 | | |
| Compression set | * | ISO 815 | % | ≤5 | | |
| Compression set | ** | ISO 815 | % | ≤6 | | |
| Minimum service temperature | | | ° C. | −30 | ° F. | −22 |
| Maximum service temperature | | | ° C. | 110 | ° F. | 230 |

* 24 h 70° C. 25% deflection
** 24 h 100° C. 25% deflection

Figure 3A:
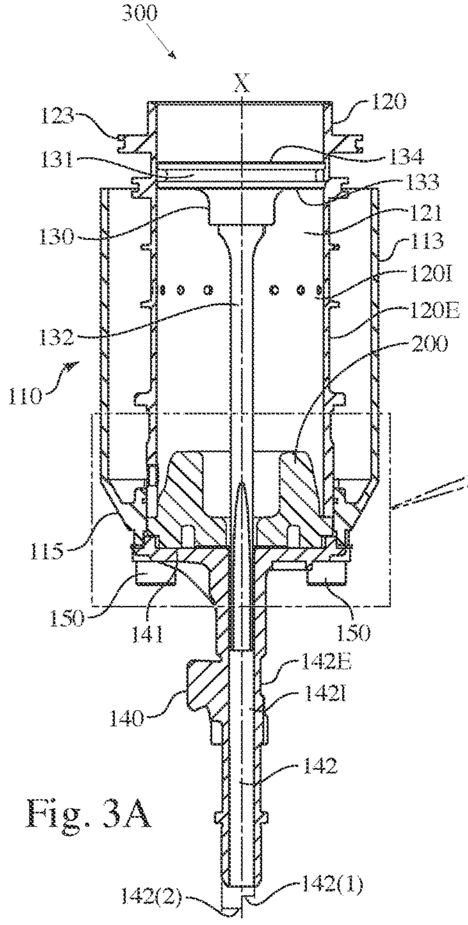
FIG. 3A presents exemplary embodiments of a pneumatic framing tool in accordance with this disclosure and having a piston driver in an up position.
Figure 3B:
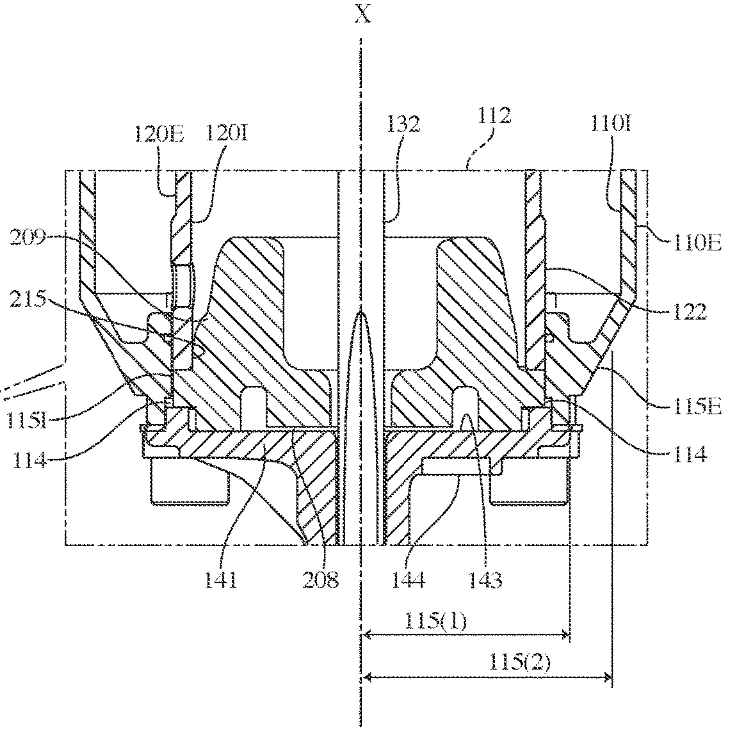
FIG. 3B presents a close up illustration of aspects of various embodiments of a pneumatic framing tool in accordance with this disclosure and having a piston driver in the up position.

FIGS. 3A and 3B depict embodiments of an assembled pneumatic framing tool assembly 300 in accordance with this disclosure and having a piston driver 130 in an up position.

An embodiment of assembled pneumatic framing tool assembly 300 may include a housing 110, a sleeve 120, a piston driver 130, a nose 140, and at least one bolt 150. In various embodiment, at least one bolt 150 is a plurality of bolts. In certain embodiments, a number of bolts 150 may be 3, and in other embodiments the number is 4.

In certain embodiments, piston driver 130 may include an annular base portion 131 and a tubular portion 132 extending axially from a center of base portion 131. Base portion 131 may extend circumferentially from the axis X with a radius 131(1) that is less than an inner radius 120(1) defined by a circular inner surface 120I of sleeve 120. Tubular portion 132 may extend axially along the axis X and have a radius 132(1). In certain embodiments, tubular portion 132 may be hollow.

In certain embodiments, nose 140 may include an annular base portion 141 centered about axis X and a tubular portion 142 extending axially from base portion 141 along axis X. A tubular portion may have an inner surface 142I defining an inner radius 142(1) and an outer surface 142E defining an outer radius 142(2). Base portion 141 may have a top surface 143, a bottom surface 144, and a tubular portion 142 extending axially from bottom surface 144.

In various embodiments, sleeve 120 is disposed within housing 110 such that bottom end 122 is at second end 112 of housing 110 and top end 123 is at first end 111 of housing 110. An external radius 120(2) may be substantially equal to an inner radius 115(1) such that a portion external surface 120E at bottom end 122 aligns with and abuts the interior surface 115I. In certain embodiments, the sleeve 120 rests inside housing 110, but is not mechanically fastened to sleeve 120.

In certain embodiments, nose 140 may be secured to housing 110 by at least one bolt 150 extending through base portion 141 and into second end 112 so that a top surface 143 abuts bottom end 122 and tubular portion 142 extends axially away from housing 110 and sleeve 120.

In some embodiments, at least one bolt 150 extends through base portion 141 and into at least one receiving portion (not shown) of second end 112. At least one receiving portion (not shown) may be defined by a threaded surface (not shown) into which at least one bolt 150 may be threadably secured. In certain embodiments, base portion 141 includes at least one receiving hole (not shown) that is aligned with each of the at least one receiving portions of second end 112 through which at least one bolt 150 is threaded and secured in a threaded surface (not shown). Bolts 150 thus secure nose 140 to housing 110. In embodiments, bolts, e.g., bolt 150, are secured using a process involving heat treatment or other techniques that include applying large amounts of force that impart a substantial load on the bolts such that removing the bolts requires application of significant forces to such bolts.

In various embodiments, a bumper 200 may be disposed within housing 110 and sleeve 120 such that when nose 140 is secured to second end 112, bottom end 203 and bottom surface 213 may be in contact with top surface 143. When bumper 200 is assembled in pneumatic framing tool assembly 300, external concentric ring 212 may rest between bottom end 122 of sleeve 120 and top surface 143 of nose 140. In such embodiments, surface 124 of bottom end 122 may rest atop or be adjacent to the top surface 214 of concentric ring 212. When bumper 200 is inserted into housing 110, annular impact cavity 114 may be empty. In other words, bumper 200 does not fill annular impact cavity 114. In certain embodiments, a radially outer surface 218 of a concentric ring 212 may abut opening 114O of annular impact cavity 114 and a portion of an interior surface 115I of end 115. In other embodiments, a radially outer surface 218 of a concentric ring 212 of bumper 200 may be adjacent to, but not abut, opening 114O of annular impact cavity 114 and a portion of an interior surface 115I of frustoconical end 115.

In some embodiments, an outer radius 212(2) of an external concentric ring 212 is equal to an outer radius 120(1) of a sleeve 120. In another embodiment, an outer radius 212(2) is less than an outer radius 120(1) but greater than an inner radius 120(1). In still other embodiments, an outer radius 212(2) may be greater than an outer radius 120(1). In such embodiments, external concentric ring 212 may achieve a compression fit or friction fit against interior surface 115I of frustoconical end 115.

When assembled, embodiments of protrusions 209 may contact an interior wall 120I along body 121 of sleeve 120 at a portion located at body 113 of housing 110, such that bumper 200 is held in place inside sleeve 120 by an interference fit. In such embodiments, a radius (not shown) of bumper 200 extending from base 211 of protrusions 209 to a center of bumper 200 may be slightly larger than internal radius 120(1) of sleeve 120 such that bumper 200 compresses slightly and is secured to sleeve 120 by this compression and/or friction. In certain embodiments, a radius of bumper 200 extending from base 211 to a center of bumper 200 may be equal to the sum of the radial thickness of base 211 and external radius 205(1) of second ring portion 205. In various embodiments, there may be an interference fit between one or more protrusions 209 and an interior wall 120I. In some embodiments, an external surface 216 of a protrusion 209 may contact an interior wall 120I. In another embodiment, a base 211 of a protrusion 209 may contact an interior wall 120I. In some embodiments, each retaining alignment protrusion 209 may contact an interior wall 120I of a sleeve 120. In other embodiments, at least one but less than all of protrusions 209 may contact interior wall 120I and yet secure a bumper 200 in place within a sleeve 120.

In some embodiments, retaining alignment protrusions 209 may assist with alignment of a bumper and a sleeve, as curved portions 215 may help to seat bumper 200 into a bottom end 122 of sleeve 120, e.g. by allowing inner wall 120I of sleeve 120 to ride along the curved surface 215 of protrusions 209 as sleeve 120 is installed over bumper 200. Alternatively, bumper 200 may be installed into sleeve 120.

In certain embodiments, a piston driver 130 may be positioned within sleeve 120 and centered along axis X such that a tubular portion 132 of piston driver 130 extends axially through a center of bumper 200 at axis Y and is received within tubular portion 142 of nose 140.

In an up position, as depicted in FIG. 3A and FIG. 3B, base portion 131 of piston driver 130 may be situated at top end 123 and at least some portion of a tubular portion 132 of piston 130 may remain within tubular portion 142 of nose 140.

In some embodiments, a bumper, e.g., bumper 200, may be inserted into and removed from a housing, e.g., housing 110, without removing bolts, e.g., bolts 150, to disconnect a nose, e.g., nose 140, from housing 110. To remove a bumper, e.g., bumper 200, piston driver 130 and sleeve 120 may first be removed from housing 110 through an opening at first end 111 (see FIG. 4A). Because bumper 200 does not include an external retaining ring that sits within a retaining groove of housing 110, e.g., annular impact cavity 114, bumper 200 may be removed from housing 110 from the opening at first end 111. Alternatively, sleeve 120 and bumper 200 may be removed together as an assembly.

In certain embodiments, by removing bumper 200 from first end 111 of housing 110 rather than from second end 112, bolts 150 do not need to be removed to separate nose 140 and housing 110 to access bumper 200 from second end 112. Such removal of bolts 150 requires imparting additional impact and torqueing forces that reduce the operating life of bolts 150, and may render bolts 150 inoperative, and require replacement of bolts 150. Therefore, embodiments of the present disclosure may increase the lifespan of bolts 150 because bolts 150 do not experience the additional impact and torqueing forces imparted during the removal process.

In some embodiments, a bumper, e.g., bumper 200, may similarly be inserted into housing 110 through the opening in first end 111 such that bottom end 203 of bumper 200 abuts top surface 143 of nose 140. Once bumper 200 has been inserted into housing 110, sleeve 120 may be inserted into housing 110 over bumper 200. When sleeve 120 is inserted, protrusions 209 of bumper 200 may guide sleeve 120 into place by guiding surface 124 of sleeve 120 along curved surface 215 of each protrusion 209 such that surface 124 of sleeve 120 abuts top surface 214 of concentric ring 212. This also may help align axis Y of bumper 200 with axis X of pneumatic framing tool X, as bumper 200 may be centered about axis X as surface 124 of sleeve 120 is guided along each curved surface 215 of each protrusion 209. Alternatively, bumper 200 and sleeve 120 may be inserted into housing 110 together as an assembly. In such embodiments, top end 207 of bumper 200 may be inserted into an opening at bottom end 122 of sleeve 120. Curved surface 215 of each protrusion 209 may guide bumper 200 into place until surface 124 of sleeve 120 abuts top surface 214 of concentric ring 212. Once bumper 200 and sleeve 120 are assembled in this way, both may be inserted as an assembly into housing 110 through the opening at first end 111 such that bottom end 203 of bumper 200 abuts top surface 143 of nose 140.

In further embodiments, once sleeve 120 and bumper 200 are in place, piston driver 130 may be inserted into sleeve 120 by guiding tubular portion 132 of piston driver 130 into housing 110 and sleeve 120 at the opening at first end 111, through the center of bumper 200 and into tubular portion 142 of nose 140. Because the insertion of sleeve 120 helps to ensure alignment of central axis Y of bumper 200 with central axis X of pneumatic framing tool 300, tubular portion 132 of piston driver 130 may pass through bumper 200 along central axis Y and central axis X. As a result, during use, tubular portion 132 of piston driver 130 may move into and out of tubular portion 142 of nose 140 without any interference between bumper 200 and an external surface of tubular portion 132. In certain embodiments, central axis Y of bumper 200 is substantially aligned with central axis X of pneumatic framing tool 300 before piston driver 130 is inserted.

Figure 4A:
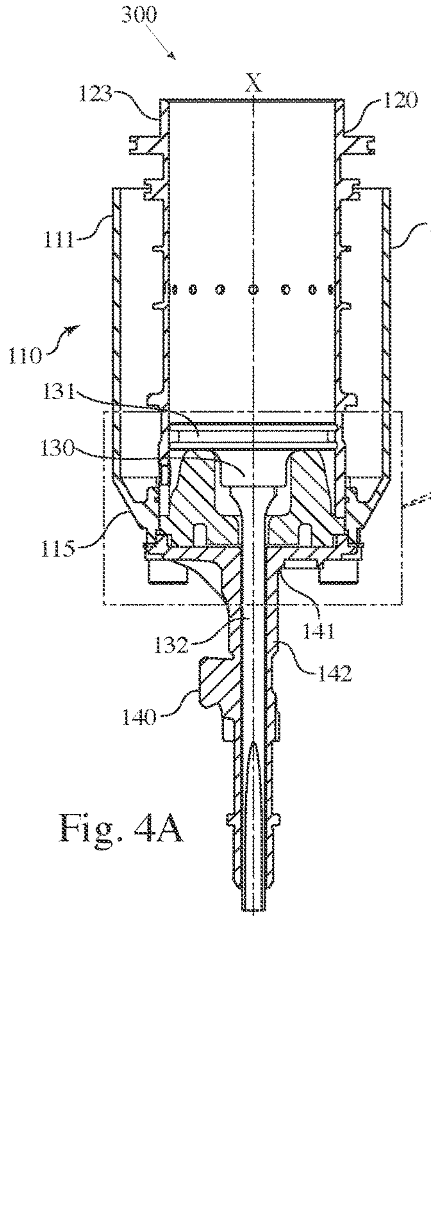
FIG. 4A presents an illustration of exemplary embodiments of a pneumatic framing tool in accordance with this disclosure and having a piston driver in a down position.
Figure 4B:
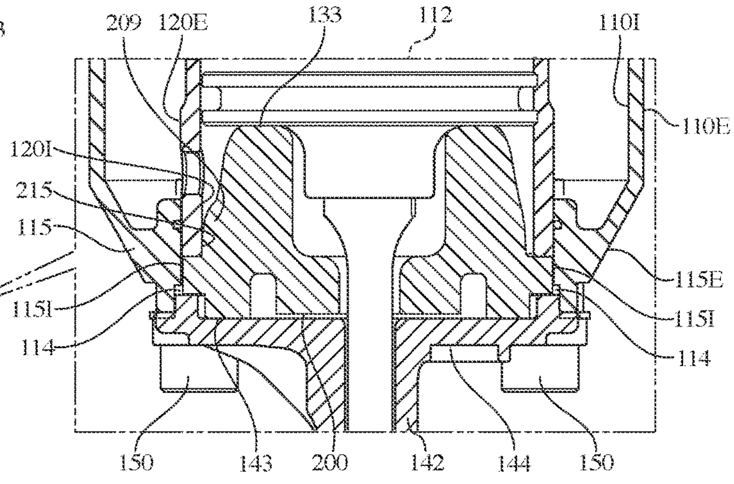
FIG. 4B presents a close up illustration of aspects of various embodiments of a pneumatic framing tool in accordance with this disclosure and having a piston driver in the down position.

FIGS. 4A and 4B present aspects of an embodiment of an assembled pneumatic framing tool assembly 300 in accordance with this disclosure in a down position.

In certain embodiments, in a down position, a bottom surface 133 of base portion 132 of piston driver 130 may strike top surface 207 of bumper 200 on a down stroke. Bumper 200 may absorb an impact force caused by piston driver 130 striking bumper 200 on a down stroke and reduce the force imparted into housing 110, nose 140, and bolts 150. In certain embodiments, because annular impact cavity 114 is empty before the impact of the piston, and is not filed by any portion of bumper 200, the impact force of the piston driver 130 that may be dissipated through bumper 200 and into housing 110, and subsequently into bolts 150 that secure housing 110 to nose 140, is reduced. In other words, by reducing the area of contact between bumper 200 and housing 110, less force from the impact of piston driver 130 may travel from bumper 200 into housing 110 and subsequently into bolts 150. Because annular impact cavity 114 remains empty during use, more force from impact of piston 130 into bumper 200 may dissipate rather than be directed into housing 110, and specifically into the receiving portions of housing 110 that receive a respective bolt 150 and through that receiving portion and into bolt 150 itself. Thereby, the force directed into bolts 150 may be reduced. This may reduce the overall shear force exhibited on the bolts, which may extend a working life of the bolts 150 and/or prevent breakage. Furthermore, by reducing the forces imparted onto bolts 150, wear may be reduced on the bolts 150, housing 110, nose 140, and pneumatic framing tool 300 generally.

In some embodiments, an annular impact cavity 114 may have an axial length defined by opening 114O that is less than an axial length of external concentric ring 212 defined by its radially outer surface 218. In other embodiments annular impact cavity 114 may have an axial length substantially equal to an axial length of external concentric ring 212. In still other embodiments, annular impact cavity 114 may have an axial length that is greater than an axial length of an external concentric ring, in which case, opening 114O may be defined in part by external concentric ring 212 and in part by an outer surface 120E of sleeve 120.

What is claimed:

1. A pneumatic framing tool, the tool comprising:

a housing comprising an axis of symmetry (X), a first end, a second end, a body extending from the first end to the second end, and an annular impact cavity located at the second end positioned such that an opening to the annular impact cavity is exposed to an interior of the housing along an interior surface of the body of the housing;

a nose centered about the axis X comprising a base portion secured to the second end of the housing by at least one bolt and a tubular portion that extends axially away from the second end of the housing;

a sleeve disposed within the housing and extending axially from a bottom end at the second end of the housing to a top end at the first end of the housing;

a piston driver disposed within the sleeve and comprising a base portion at a second end of the piston driver extending circumferentially from the axis X and a tubular portion that extends axially from the base portion of the piston driver along the axis X into the tubular portion of the nose to a second end of the piston driver; and a bumper comprising:

a body, defined by a tiered ring shape, centered about the axis X and extending axially between a top surface located at a top end of the body and a bottom surface located at a bottom end of the body, the tiered ring shape comprising a first ring portion comprising an outer radius and an inner radius and a second ring portion comprising an outer radius and an inner radius, wherein the outer radius of the first ring portion is less than the outer radius of the second ring portion, and wherein a bottom boundary of the first ring portion and a top boundary of the second ring portion meet to form a continuous exterior surface;

an external concentric ring circumferentially spaced from the axis X and positioned axially about the body of the bumper, wherein an outer radius of the external concentric ring is greater than the outer radius of the second ring portion and an inner radius of the concentric ring is substantially equal to the outer radius of the second ring portion; and a plurality of tapered retaining alignment protrusions circumferentially spaced on the exterior surface of the body, wherein the retaining alignment protrusions comprise a curved portion extending axially from a base located on a top surface of the external concentric ring to an upper boundary located at a portion of the exterior surface of the body axially between the top end of the body and the external concentric ring, wherein the housing comprises the bumper at the second end of the housing, the bottom surface of the bumper contacts an interior surface of the base of the nose, the external concentric ring extends between the bottom end of the sleeve and the base portion of the nose and is configured such that the concentric ring is adjacent to the annular impact cavity of the housing, the annular impact cavity remaining empty, and the tubular portion of the piston driver extends axially through the bumper along the axis of symmetry X.

2. The pneumatic framing tool of claim 1, wherein the pneumatic framing tool is configured such that a bottom surface of the base of the piston driver impacts the top surface of the bumper in a down position.

3. The pneumatic framing tool of claim 1, wherein the piston driver is removable from the sleeve through the top end of the sleeve.

4. The pneumatic framing tool of claim 1, wherein the tool is configured such that bumper is insertable and removable from the sleeve through the top end of the sleeve.

5. The pneumatic framing tool of claim 1, wherein the annular impact cavity comprises an axial length less than an axial length of the external concentric ring.

6. The pneumatic framing tool of claim 1, wherein each of the plurality of retaining alignment protrusions contacts an internal wall of the sleeve.

7. The pneumatic framing tool of claim 1, wherein a sum of a radial thickness of the base of each protrusion of the plurality of protrusions and the outer radius of the second ring portion of the body of the bumper is at most 10% greater than an inner radius of the sleeve and is at least 10% less than the inner radius of the sleeve.

8. The pneumatic framing tool of claim 7, wherein the inner radius of the sleeve is 28.5 mm.

9. The pneumatic framing tool of claim 1, wherein the outer radius of the external concentric ring is equal to an outer radius of the sleeve.

10. The pneumatic framing tool of claim 1, wherein a radial thickness of the base of the retaining alignment protrusion is less than a radial thickness of the concentric ring.

11. The pneumatic framing tool of claim 10, wherein a sum of the inner radius of the external concentric ring and the radial thickness of the base of the retaining alignment protrusion is greater than an inner radius of the sleeve.

12. An impact absorbing bumper having an axis of symmetry (Y), the bumper comprising:

a body comprising a tiered ring shape centered about the axis of symmetry (Y) and extending axially between a top surface located at a top end of the body and a bottom surface located at a bottom end of the body, the tiered ring shape comprising:

a first ring portion comprising an outer radius and an inner radius;

a second ring portion comprising an outer radius and an inner radius; and a base portion comprising an inner radius and an outer radius, wherein the outer radius of the first ring portion is less than the outer radius of the second ring portion, a bottom boundary of the first ring portion and a top boundary of the second ring portion meet to form a continuous exterior surface, and the base portion forms a continuous exterior surface with the second ring portion;

an external concentric ring circumferentially spaced from the axis of symmetry (Y), positioned axially about the body of the bumper, wherein an outer radius of the concentric ring is greater than the outer radius of the second ring portion and an inner radius of the concentric ring is substantially equal to the outer radius of the second ring portion, wherein the external concentric ring is positioned axially such that at least a portion of the base of the tiered ring shape extends axially beyond a bottom surface of the external concentric ring;

a plurality of tapered retaining alignment protrusions circumferentially spaced on the exterior surface of the body, wherein the protrusions comprise a curved portion extending axially from a base located on a top surface of the external concentric ring to a tapered boundary located at a portion of the exterior surface of the body axially between the top end of the body and the external concentric ring.

13. The bumper of claim 12, wherein the portion of the exterior surface of the body axially between the top end of the body and the external concentric ring comprises the top boundary of the second portion.

14. The bumper of claim 12, wherein a radial thickness of the base of the retaining alignment protrusion is less than a radial thickness of the concentric ring.

15. The bumper of claim 12, wherein the inner radius of the first ring portion and the inner radius of the second ring portion are equal.

16. The bumper of claim 12, wherein the plurality of tapered retaining alignment protrusions comprises 8 protrusions.

17. The bumper of claim 12, wherein the tapered retaining alignment protrusions of the plurality of tapered retaining alignment protrusions are evenly spaced about the external concentric ring.

18. An impact absorbing bumper for use in a pneumatic tool comprising an annular impact cavity defined in part by a housing and a nose portion, the housing and the nose portion assembled together by at least one nose bolt and each extending circumferentially about an axis of symmetry, the impact absorbing bumper comprising:

a circumferential body defining a first radial void about the axis of symmetry configured to receive a tubular portion of a piston driver in an assembled configuration, the circumferential body comprising a first radially outer annular surface defining a first radius that is less than a second radius defined by an inner surface of the housing;

an external circumferential ring annularly extending from a base portion of the circumferential body and configured to annularly abut the inner surface of the housing, whereby when in the assembled configuration a radially external annular surface of the external circumferential ring defines a radially inner external boundary of the annular impact cavity.

19. The impact absorbing bumper of claim 18, wherein the first radius is less than a third radius defined by an inner surface of a cylindrical sleeve of the pneumatic tool, the impact absorbing bumper further comprising a plurality of radially extending alignment protrusions disposed about the first radially outer annular surface and axially above the external circumferential ring, each radially extending alignment protrusion defining a radius that is about equal to the third radius.

20. The impact absorbing bumper of claim 19, wherein an annular bottom surface of the cylindrical sleeve abuts an annular top surface of the external circumferential ring, an outer surface of the cylindrical sleeve abuts the inner surface of the housing above the annular impact cavity, and a bottom surface of the external circumferential ring abuts the nose portion.

21. A method for inserting a bumper from a pneumatic framing tool, the method comprising:

opening a housing of the pneumatic framing tool at a first end opposite a second end, wherein the second end comprises:

an annular impact cavity;

a nose axially opposite the annular impact cavity; and a plurality of bolts configured to secure the nose to the housing at the second end of the housing;

inserting the bumper into the housing through the first end of the housing, wherein the bumper comprises:

an annular body comprising an external outer surface defining a second radius that is less than a first radius of the sleeve such that, in an assembled configuration, the external outer surface of the annular body does not contact the internal surface of the sleeve;

a plurality of alignment protrusions disposed circumferentially about the external outer surface, each alignment protrusion radially extending from the external outer surface and defining a third radius that is equal to or greater than the first radius; and an external circumferential ring extending radially outward from a base portion of the external outer surface to define an annular external surface defining a fourth radius larger than the first radius and further defining a lower surface that extends radially and is configured to contact an internal surface of the nose;

inserting a sleeve into the housing through the first end of the housing and over the bumper, wherein an outer surface of the sleeve abuts an inner surface of the housing above the annular impact cavity, and a bottom axial surface of the sleeve abuts a top axial surface of the external circumferential ring; and inserting a piston driver into the housing through the first end of the housing, wherein a tubular portion of the piston driver extends through a center of the bumper and into a tubular portion of the nose, wherein the fourth radius is configured such that the external circumferential ring does not fill any portion of the annular impact cavity.

* * * * *